US007418719B2

(12) United States Patent
Kariv et al.

(10) Patent No.: US 7,418,719 B2
(45) Date of Patent: *Aug. 26, 2008

(54) METHOD AND SYSTEM TO SUPPORT A UNIFIED PROCESS MODEL FOR HANDLING MESSAGES SENT IN DIFFERENT PROTOCOLS

(75) Inventors: Shai Kariv, Bellevue, WA (US);
Geoffrey M. Kizer, Seattle, WA (US);
Emily Kruglick, Sammamish, WA (US);
Lance E. Olson, Sammamish, WA (US);
Erik B. Christensen, Seattle, WA (US);
Kenneth D. Wolf, Seattle, WA (US);
Dmitry Robsman, Bellevue, WA (US);
Shanku Shivabrata Niyogi, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 668 days.

This patent is subject to a terminal disclaimer.

(21) Appl. No.: 10/931,600

(22) Filed: Aug. 31, 2004

(65) Prior Publication Data
US 2006/0047532 A1    Mar. 2, 2006

(51) Int. Cl.
*G06F 3/00* (2006.01)
*G06F 9/44* (2006.01)
*G06F 9/46* (2006.01)
*G06F 13/00* (2006.01)

(52) U.S. Cl. ...................... 719/330; 719/314
(58) Field of Classification Search ............... 719/330, 719/314, 313; 709/230
See application file for complete search history.

(56) References Cited

U.S. PATENT DOCUMENTS

| | | |
|---|---|---|
| 5,146,593 A | 9/1992 | Brandle et al. |
| 5,155,837 A | 10/1992 | Liu et al. |
| 5,535,322 A | 7/1996 | Hecht |
| 5,590,266 A | 12/1996 | Carson et al. |
| 5,706,507 A | 1/1998 | Schloss |
| 5,715,386 A | 2/1998 | Fulton, III et al. |
| 5,845,280 A | 12/1998 | Treadwell, III et al. |
| 5,878,408 A | 3/1999 | Van Huben et al. |

(Continued)

OTHER PUBLICATIONS

Reis, R. Q., "Dynamic Software Process Manager for the PROSOFT Software Engineering Environment", SoST98': Symposium on Software Technology Process Improvement: Putting Software Environment to Work, pp. 197-202, Sep. 1998.

(Continued)

*Primary Examiner*—Meng-Ai An
*Assistant Examiner*—KimbleAnn Verdi
(74) *Attorney, Agent, or Firm*—Lee & Hayes, PLLC

(57) ABSTRACT

A server system in typical operation has a process manager, multiple listeners (each to receive requests for its protocols) and multiple worker processes that are each able to handle requests in multiple protocols. At server start-up, each listener connects with the process manager via a pipe published by the process manager. The listener then receives information via the process manager that includes information defining the applications(s) for which that listener is to "listen" and associating selected application(s) to application pool(s). When the listener detects a request for such an application, the listener starts a queue for the associated application pool. In response, the process manager launches an appropriate worker process to handle requests in the listener's protocol. The worker process then makes a connection with the listener.

15 Claims, 7 Drawing Sheets

U.S. PATENT DOCUMENTS

| | | | |
|---|---|---|---|
| 5,918,226 A | 6/1999 | Tarumi et al. | |
| 5,920,867 A | 7/1999 | Van Huben et al. | |
| 5,920,873 A | 7/1999 | Van Huben et al. | |
| 5,928,323 A | 7/1999 | Gosling et al. | |
| 5,930,830 A | 7/1999 | Mendelson et al. | |
| 6,023,702 A | 2/2000 | Leisten et al. | |
| 6,067,580 A * | 5/2000 | Aman et al. | 719/330 |
| 6,094,654 A | 7/2000 | Van Huben et al. | |
| 6,098,064 A | 8/2000 | Pirolli et al. | |
| 6,112,196 A * | 8/2000 | Zimowski et al. | 707/2 |
| 6,157,959 A | 12/2000 | Bonham et al. | |
| 6,188,698 B1 | 2/2001 | Galand et al. | |
| 6,209,018 B1 * | 3/2001 | Ben-Shachar et al. | 718/105 |
| 6,212,573 B1 * | 4/2001 | Lim et al. | 719/315 |
| 6,219,760 B1 | 4/2001 | McMinn | |
| 6,223,202 B1 | 4/2001 | Bayeh | |
| 6,223,207 B1 | 4/2001 | Lucovsky et al. | |
| 6,289,458 B1 | 9/2001 | Garg et al. | |
| 6,327,594 B1 | 12/2001 | Van Huben et al. | |
| 6,339,771 B1 * | 1/2002 | Zimowski et al. | 707/2 |
| 6,389,421 B1 | 5/2002 | Hawkins et al. | |
| 6,463,465 B1 | 10/2002 | Nieuwejaar | |
| 6,542,920 B1 * | 4/2003 | Belkin et al. | 718/104 |
| 6,574,712 B1 | 6/2003 | Kahle et al. | |
| 6,594,784 B1 | 7/2003 | Harper et al. | |
| 6,604,106 B1 | 8/2003 | Bodin et al. | |
| 6,622,168 B1 | 9/2003 | Datta | |
| 6,629,266 B1 | 9/2003 | Harper et al. | |
| 6,636,900 B2 * | 10/2003 | Abdelnur | 719/316 |
| 6,671,716 B1 * | 12/2003 | Diedrichsen et al. | 709/203 |
| 6,732,138 B1 | 5/2004 | Browning et al. | |
| 6,792,611 B2 | 9/2004 | Honishi et al. | |
| 6,810,495 B2 | 10/2004 | Castelli et al. | |
| 6,820,215 B2 | 11/2004 | Harper et al. | |
| 6,915,384 B2 | 7/2005 | Mitra et al. | |
| 6,941,379 B1 * | 9/2005 | Dingsor et al. | 709/235 |
| 6,978,398 B2 | 12/2005 | Harper et al. | |
| 6,990,513 B2 | 1/2006 | Belfiore et al. | |
| 7,028,091 B1 | 4/2006 | Tripathi et al. | |
| 7,028,312 B1 * | 4/2006 | Merrick et al. | 719/330 |
| 7,107,329 B1 * | 9/2006 | Schroder et al. | 709/221 |
| 7,257,819 B1 * | 8/2007 | Dixon et al. | 719/316 |
| 7,330,483 B1 * | 2/2008 | Peters et al. | 370/466 |
| 7,356,803 B2 * | 4/2008 | Bau et al. | 717/116 |
| 2001/0010053 A1 * | 7/2001 | Ben-Shachar et al. | 709/105 |
| 2002/0047899 A1 | 4/2002 | Son et al. | |
| 2002/0059425 A1 * | 5/2002 | Belfiore et al. | 709/226 |
| 2002/0062372 A1 | 5/2002 | Hong et al. | |
| 2002/0065900 A1 * | 5/2002 | Dor et al. | 709/217 |
| 2002/0069420 A1 | 6/2002 | Russell et al. | |
| 2002/0073132 A1 * | 6/2002 | Van Garderen et al. | 709/102 |
| 2002/0078174 A1 | 6/2002 | Sim et al. | |
| 2002/0083214 A1 * | 6/2002 | Heisig et al. | 709/315 |
| 2002/0087612 A1 | 7/2002 | Harper et al. | |
| 2002/0087797 A1 | 7/2002 | Adrangi | |
| 2002/0120710 A1 | 8/2002 | Chintalapati et al. | |
| 2002/0129123 A1 | 9/2002 | Johnson et al. | |
| 2002/0147823 A1 * | 10/2002 | Healy | 709/230 |
| 2002/0147966 A1 | 10/2002 | Frazier | |
| 2002/0152328 A1 | 10/2002 | Kagan et al. | |
| 2002/0161908 A1 | 10/2002 | Benitez et al. | |
| 2003/0005122 A1 | 1/2003 | Freimuth et al. | |
| 2003/0005181 A1 * | 1/2003 | Bau et al. | 709/330 |
| 2003/0023957 A1 * | 1/2003 | Bau et al. | 717/140 |
| 2003/0061378 A1 | 3/2003 | Mazzitelli | |
| 2003/0079154 A1 | 4/2003 | Park et al. | |
| 2003/0084018 A1 * | 5/2003 | Chintalapati et al. | 707/1 |
| 2003/0135464 A1 | 7/2003 | Mourad et al. | |
| 2003/0135542 A1 * | 7/2003 | Boudreau | 709/203 |
| 2003/0182400 A1 * | 9/2003 | Karagounis et al. | 709/219 |
| 2004/0068479 A1 * | 4/2004 | Wolfson et al. | 707/1 |
| 2004/0205048 A1 * | 10/2004 | Pizzo et al. | 707/3 |
| 2004/0205769 A1 * | 10/2004 | Ruutu | 719/313 |
| 2005/0021689 A1 * | 1/2005 | Marvin et al. | 709/220 |
| 2005/0235290 A1 * | 10/2005 | Jefferson et al. | 719/310 |
| 2005/0246415 A1 | 11/2005 | Belfiore et al. | |
| 2007/0078995 A1 * | 4/2007 | Benard et al. | 709/230 |
| 2007/0199001 A1 * | 8/2007 | Grasso | 719/330 |
| 2007/0204279 A1 * | 8/2007 | Warshavsky et al. | 719/330 |

OTHER PUBLICATIONS

Hunt, G.D.H., "Network Dispatcher: A Connection Router for Scalable Internet Services", Computer Networks and ISDN Systems Conference Title: Comput. Netw. ISDN Syst., vol. 30, No. 1-7, pp. 347-357, Apr. 1998.

Saslgarelli, L., "Supporting IP Multicast Integrated Services in ATM Networks", Broadband Networking Technologies, pp. 78-88, Nov. 1997.

Donnelly, P., "Writing IIS Applications in Dyalog APL", APL Quote Quad,, vol. 33, No. 1, pp. 13-17, Sep. 1990.

Alexandrov, I et al., "Process Management Inside ATLAS DAQ", IEEE Transactions on Nuclear Science, vol. 49, No. 5, pp. 2459-2462, Oct. 2002.

Fitzpatrick, M., "The IRAF Client Display Library (CDL)", vol. 145, pp. 200-203, Astronomical Society of the Pacific Conference Series Conference, Sep. 1997.

Canosa, M., "Extensions to the MARS Model for IP Integrated Services over ATM Networks", Internet Routing and Quality of Serivce, pp. 132-142, Nov. 1998.

Shim, Jae-Hong, "Mike: Real-Time Microkernel Supporting Monitor Concept", Hanguk Chongbo Kwahakhoe Chi=Journal of the Korean Information Science Society, vol. 25, No. 2, pp. 166-176, Feb. 1998.

Chen, Q, "How Agents from Different E-Commerce Enterprises Cooperate", Proceedings 5th International Symposiumo n Autonomous Decentralized Systems, pp. 341-348, Mar. 2001.

Tanaka, M., "A File Service Mechanism for Distributed Systems", Quarterly Reports Railway Technical Research Institute, vol. 31, No. 3, pp. 160-164, Sep. 1990.

Caucho Servlet Engine on Apache Unix, Mar. 12, 2008 at <<http://web.archive.org/web/2001040144529/caucho.com/products/resin/ref/cs3-apache-unix.xtp>>, Caucho, 1998-2001, pp. 1-6.

Li et al., "An Approach for Estimation of Software Aging in a Web Server", IEEE, Proceedings of the 2002 International Symposium on Empirical Software Engineering, 2002, 10 pgs.

Mercer et al., "Processor Capacity Reserves: An Abstraction for Managing Processor Usage", Workstation Operating Systems, 1993. Proceedings. Fourth Workshop on Oct. 14-15, 1993, pp. 129-134.

Tanenbaum, "Structured Computer Organization", Prentice-Hall Inc, 1984, pp. 10-12.

"Web Application: Servlets and Filters" retrieved at <<http://www.caucho.com/resin-3.0/config/webapp.xtp>> on Mar. 12, 2008, Caucho Technologies Inc, 21 pgs.

Zhou et al., "Processor Pool-Based Scheduling for Large-Scale NUMA Multiprocessors", Joint International Conference on Measurement and Modeling of Computer Systems, ACM, 1991, pp. 133-142.

* cited by examiner

METHOD AND SYSTEM TO SUPPORT A UNIFIED PROCESS MODEL FOR HANDLING MESSAGES SENT IN DIFFERENT PROTOCOLS

CROSS-REFERENCE TO RELATED APPLICATIONS

This application is related to co-filed and commonly assigned U.S. patent application Ser. No. 10/931,349 entitled "URL Namespace to Support Multiple-Protocol Processing within Worker Processes" and to co-filed and commonly assigned U.S. patent application Ser. No. 10/931,437 entitled "Method and System to Multiple-Protocol Processing Within Worker Processes."

This application is also related to co-pending and commonly assigned U.S. patent application Ser. No. 09/878,950 entitled "Methods and Arrangements for Routing Server Requests to Worker Processes Based on URL" filed on Jun. 11, 2001; U.S. patent application Ser. No. 10/377,175 entitled "An Improved Web Server Architecture" filed Feb. 28, 2003; U.S. patent application Ser. No. 10/377,148 entitled "Ensuring the Health and Availability of Web Applications" filed Feb. 28, 2003; and U.S. patent application Ser. No. 10/377,176 entitled "Web Garden Application Pools Having a Plurality of User-Mode Web Applications" filed Feb. 28, 2003.

FIELD

Various embodiments described below relate generally to computers and like devices, and more particularly but not exclusively to servers. Still more particularly, various embodiments relate to connections to worker processes running on servers.

BACKGROUND

The popularity of the Internet, and in particular, the portion of the Internet known as the World Wide Web, continues to grow. The World Wide Web is basically a collection of computers that are operatively linked together through a plurality of communication networks. Typically, users access the World Wide Web through a personal computer or like device, which is connected to the Internet via a modem of some type. For example, many users of the World Wide Web connect to the Internet using a dial-up telephone networked modem configured to establish data communications through an Internet Services Provider (ISP). Other users connect to the Internet with a faster modem, e.g., a cable modem, digital subscriber line (DSL) modem, etc.

Regardless of how a user ultimately connects to the Internet/World Wide Web, once connected the user typically accesses information available therein by using a web browser or like application. A web browser is configured to access web pages that are provided through the Internet by other computers. For example, one or more web server computers may be connected to the Internet and configured with one or more web sites or other supporting web applications. A web site typically has one or more static web pages and/or is capable of supplying one or more dynamically generated web pages that the user may selectively download, view and possible interact with.

To identify a particular web site/page the user will typically select a hyper link to the desired web site/page or may choose to manually enter a unique name for the web site/page. The most common name used for identifying a web site/page is known as the uniform resource locator (URL). For example, by entering a URL, the user will be connected to an appropriate web server which hosts the applicable web application(s), and the requested web page will be downloaded using a hypertext transfer protocol (HTTP) to the web browser. Within the Internet itself, the selected URL is associated with a specific Internet Protocol (IP) address. This IP address takes the form of a unique numerical identifier, which has been assigned to the targeted web server. Thus, a user may also directly enter an IP address in the web browser. However, the majority of users tend to favor the use of the more easily remembered and entered URL.

When a typical web server receives a request, e.g., an HTTP request, from a web browser, it needs to handle the request. Hence, a web server process may be configured to handle the request itself, or may need to pass the request on to another process, e.g., a worker process, that is configured to handle the request. Conventional web server processes typically listen to a particular port (e.g., "port 80") provided by a Transmission Control Protocol/Internet Protocol (TCP/IP) kernel-mode provided service. When a request is received, the web server process either handles the request or calls for a worker process to handle the request. To determine which worker process should handle the request, most conventional web server processes either map the request to a physical file or to a dynamic application of some sort, such as a dynamic-linked library (DLL) or common gateway interface (CGI) process. Mapping is typically based on the extension provided at the end of the URL. For example, an ".html" extension signifies that the desired web page is in a HyperText Markup Language format. This extension could then be found, for example, in a look-up table, and associated with a specific worker process, if needed. Conversely, the .html extension may identify that the web server process can handle the request itself. There exists a plurality of extensions that may be used to identify the applicable worker process.

Once a specific worker process has been identified, the worker process is started (as needed) and the request is forwarded to the worker process. Such decisions and subsequent routing of the request are conducted by user-mode processes.

Conventional web servers typically incur a delay associated with such user-mode "process hops". For such web servers, which often receive thousands of requests each minute, the delays associated with process hops can diminish the efficiency of the web server. In certain configurations, the web server process may be required to share a common communication port with one or more worker processes. This too may further reduce the efficiency of the web server. In addition, there can be a reduction in the robustness of the web server in certain situations, e.g., when a worker process fails to receive/complete the request, etc.

SUMMARY

According to aspects of the various embodiments, methods and systems are provided for connecting services (e.g., listener services) with worker processes to handle requests in multiple protocols. In one aspect, a system includes a server having a process manager and one or more listeners, and multiple clients that request services from the server. The clients can send requests in different protocols, and the server includes at least one listener to process each supported protocol. In one aspect, each listener is configured to receive requests in a selected protocol, with different listeners processing different protocols so that multiple protocols are supported.

In an initialization operation, each listener receives information from the process manager that the listener uses to process received requests. The information includes notification of which application(s) that the listener is to listen for when receiving requests from clients. The information also includes associations (e.g., mappings) between applications and application pools. In one embodiment, an application pool is a collection of applications that all route to the same set of worker processes. When the listener receives a request for an application for which it is listening, the listener starts a queue for the requested application and signals the process manager to launch a worker process to handle the request.

In one embodiment, the listener indicates the application pool associated with the requested application. The process manager can then launch a worker process for that application pool. The worker process includes at least one protocol handler. A protocol handler is a component that supports sending/receiving of messages in a particular protocol (e.g., a protocol handler for the listener's protocol in this case). The worker process can then make a connection with the listener. This system can advantageously provide support for multiple protocols, which can increase the flexibility of the system in handling various requests from clients.

In another aspect, each listener receives the information from the process manager. For example, each listener can receive this information by connecting to a pipe published by the process manager. In one embodiment, the listeners connect to a published pipe in a "first to detect" process. That is, the first listener to detect the pipe published by the process manager can connect to the pipe. The process manager continues to publish pipes for the listeners to connect. This aspect provides a flexible and complete mechanism to connect all of the listeners to the process manager in preparation for connecting listeners with worker processes in response to server requests received from clients.

In still another aspect, the listeners can be configured by the process manager to disable either existing applications or existing application pools, thus having the listeners not process requests sent for a specific application, or in the case of a disabled application pool, any request sent to any application in the pool.

In yet another aspect, a listener can work with a listener adapter that handles information exchange between the listener and the process manager. In some embodiments, the listener adapter can be in a separate process from the listener. In some embodiments, the listener can be in either user mode or kernel mode, while the listener adapter is user mode.

BRIEF DESCRIPTION OF THE DRAWINGS

Non-limiting and non-exhaustive embodiments are described with reference to the following figures, wherein like reference numerals refer to like parts throughout the various views unless otherwise specified.

DETAILED DESCRIPTION

The following techniques and mechanisms are directed to implementing methods and systems for establishing connections between listeners and worker processes to support handling of requests in different protocols. Generally stated, a service (e.g., a listener) connects with a process manager via a pipe published by the process manager. When the listener receives a request, it starts an internal queue corresponding to that request and signals (e.g., send a message or make a call) the process manager to launch a worker process to handle the request. In signaling the process manager, the listener effectively indicates the protocol of the request. For example, in one embodiment, each listener has registered the protocol it handles with the process manager during an installation process and, thus, inherently indicates the request's protocol when it sends the message to the process manager. The process manager launches the worker process with an appropriate protocol handler so that the worker process can correctly handle the requests. The worker process then makes a connection with the listener and pulls requests from the listener's internal queue. Specific implementations of this general concept are described below.

General Overview of System

Figure 1:
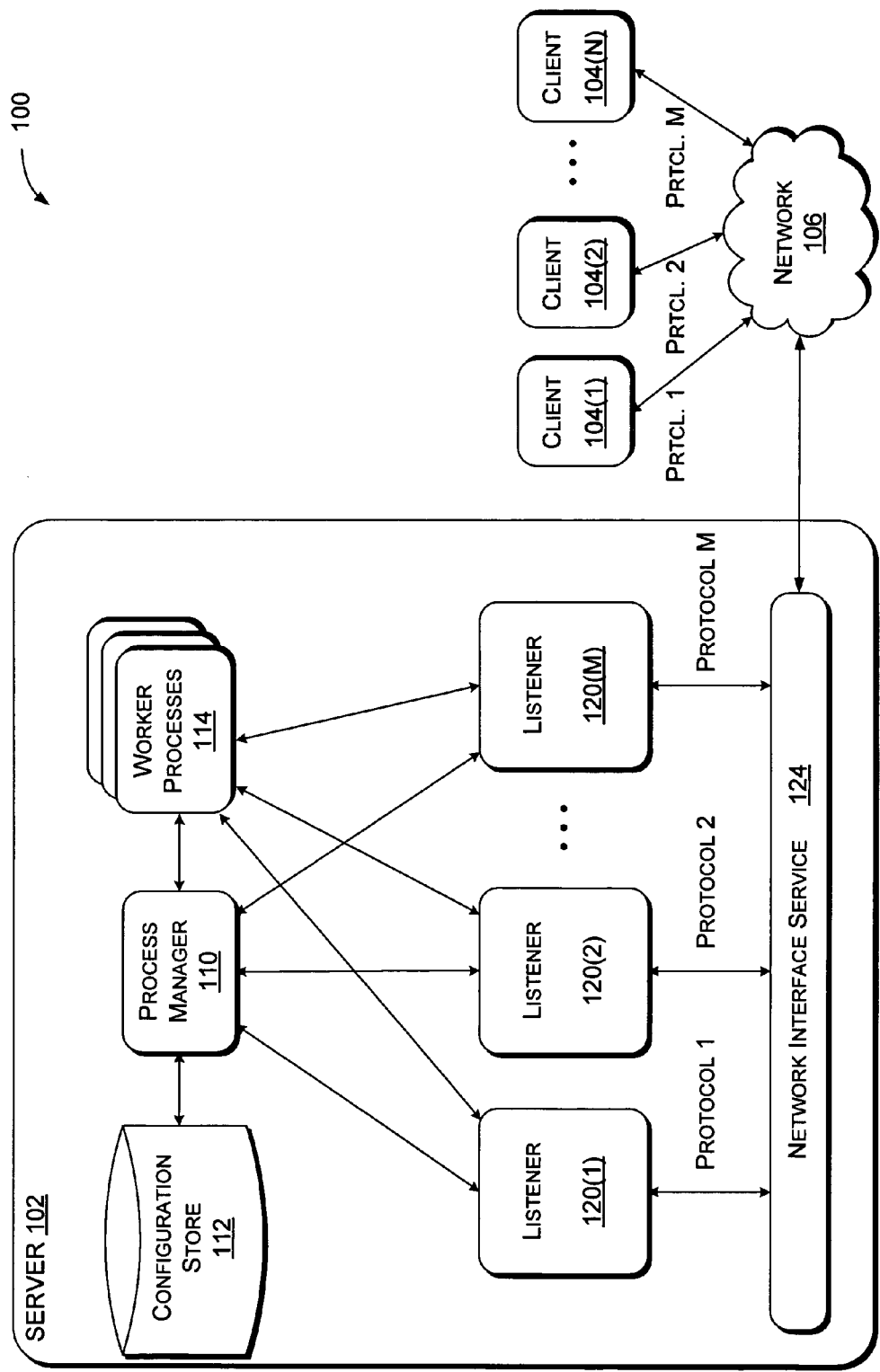
FIG. 1 is a functional block diagram illustrating a client-server system having listeners supporting multiple protocols, according to one embodiment.

FIG. 1 illustrates a client-server system 100 having multiple listeners that each support processing of requests in a preselected protocol, according to one embodiment. In this embodiment, system 100 includes a server 102, clients 104(1)-104(N), and a network 106 over which server 102 and clients 104(1)-104(N) communicate. Further, during typical operation, server 102 includes a process manager 110, a configuration store 112, worker processes 114 and listeners 120(1)-120(M) in this embodiment. In some embodiments, each listener includes a listener adapter (not shown) and a listener component (not shown). In other embodiments, the listener adapter and the listener component are separate components and can be in separate processes. For each listener, the listener adapter exchanges information with process manager 110 and configures the listener component based on information received from process manager 110. Server 102, in this embodiment, also includes a network interface service 124. In one embodiment, network interface service 124 is implemented as a TCP/IP kernel mode service.

In addition to describing methods and systems to establish connections between listeners and worker processes to support requests in multiple protocols, the general operation of system 100 is described below to facilitate understanding of the operation of the various embodiments.

In this exemplary embodiment, system 100 is used to service requests in various protocols sent by clients 104(1)-104(N) via network 106 for web services provided by server 102. In some embodiments, process manager 110, listeners 120(1)-120(M) and worker processes 114 are implemented as disclosed in the aforementioned co-filed and commonly assigned U.S. patent application Ser. Nos. 10/931,349 and 10/931,437, although in other embodiments these components may be implemented differently. Each of these elements is generally described below.

Configuration store 112 is used to store information about the configuration of server 102 to allow for associations to be made between applications (which can include sites/pages/services provided by server 102) and application pools. For example, configuration store 112 may define multiple application pools (as previously mentioned, an application pool is a collection of applications that all route to the same set of worker processes). In one embodiment, process manager 110 uses information in configuration store 112 to configure listeners 120(1)-120(M) to listen for application URIs and identify appropriate application pools for servicing the requests based on the application URIs. Configuration store 112 may be updated by an administrator.

Process manager 110 generally operates to configure listeners 120(1)-120(M), and to launch and manage worker processes 114 in response to requests received by listeners 120(1)-120(M) from clients 104(1)-104(N). For example, process manager 110 can configure listeners 120(1)-120(M) using information from configuration store 112. In other embodiments, process manager 110 may configure listeners using information obtained in other ways.

Listeners, after being configured by process manager 110, operate to receive service requests from clients 104(1)-104(N) and support communication between the clients and worker processes 114. For example, in one embodiment, a listener examines a received request to identify an appropriate application pool, as described in the aforementioned U.S. patent application Ser. No. 10/931,349. Each listener supports a specific protocol so that together, the listeners support handling of requests in multiple protocols.

Worker processes 114 handle requests, which can originate from clients in multiple protocols. As previously described, worker processes 114 are launched by process manager 110 in response to requests received by listeners 120(1)-120(M). Inside worker processes 114, protocol handlers are loaded to connect with listeners 120(1)-120(M) to route requests to the appropriate application in the worker process for servicing. A worker process can support more than one protocol. In this embodiment, each of the worker processes is supported by a private (non-shared) interface with a listener.

Network interface service 124 provides services to support communication over network 106. In a typical embodiment, network interface service 124 provides support for TCP/IP communication over network 106. In other embodiments in which network 106 uses a different protocol, network interface service 124 would be configured to provide support for this other protocol.

Figure 2:
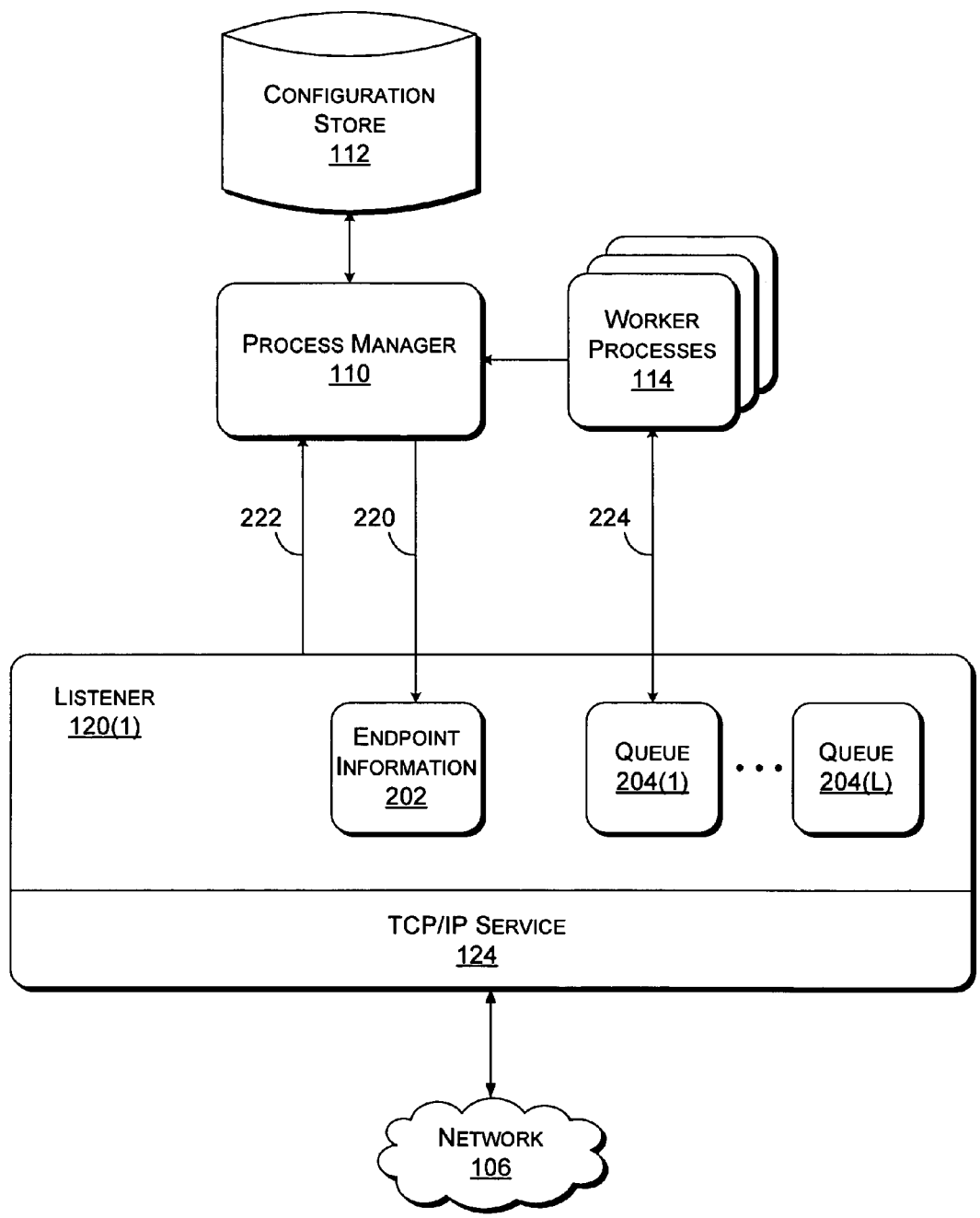
FIG. 2 is a functional block diagram illustrating a single listener in more detail, according to one embodiment.

FIG. 2 illustrates an embodiment of listener 120(1) in more detail, which can also apply to listeners 120(2)-120(M). This embodiment of listener 120(1) includes endpoint information 202, and queues 204(1)-204(L). In addition, network interface service 124 (FIG. 1) is implemented as a TCP/IP service in this embodiment.

In this embodiment, endpoint information 202 is obtained from configuration store 112 via process manager 110 as indicated by an arrow 220. As previously described, endpoint information 202 can include information for configuring listener 120(1) to listen for one or more particular applications when receiving requests. In addition, endpoint information 202 can include information for associating detected applications to appropriate application pools. For example, one such association may map multiple applications (also referred to herein as a binding) to a particular application pool.

Queues 204(1)-204(L) are created by listener 120(1) in response to requests received from clients (see FIG. 1) via network 106. For example, after receiving a request, listener 120(1) can identify an application pool associated with an application in the request using endpoint information 202 and then create a new queue for the identified application pool. The listener can then route the request to this internal queue.

Listener 120(1) may also route received requests to existing queues. For example, if listener 120(1) receives a request that references an application that is mapped to an application pool for which a queue has already been created, then listener 120(1) will route that request to that existing queue.

Figure 3:
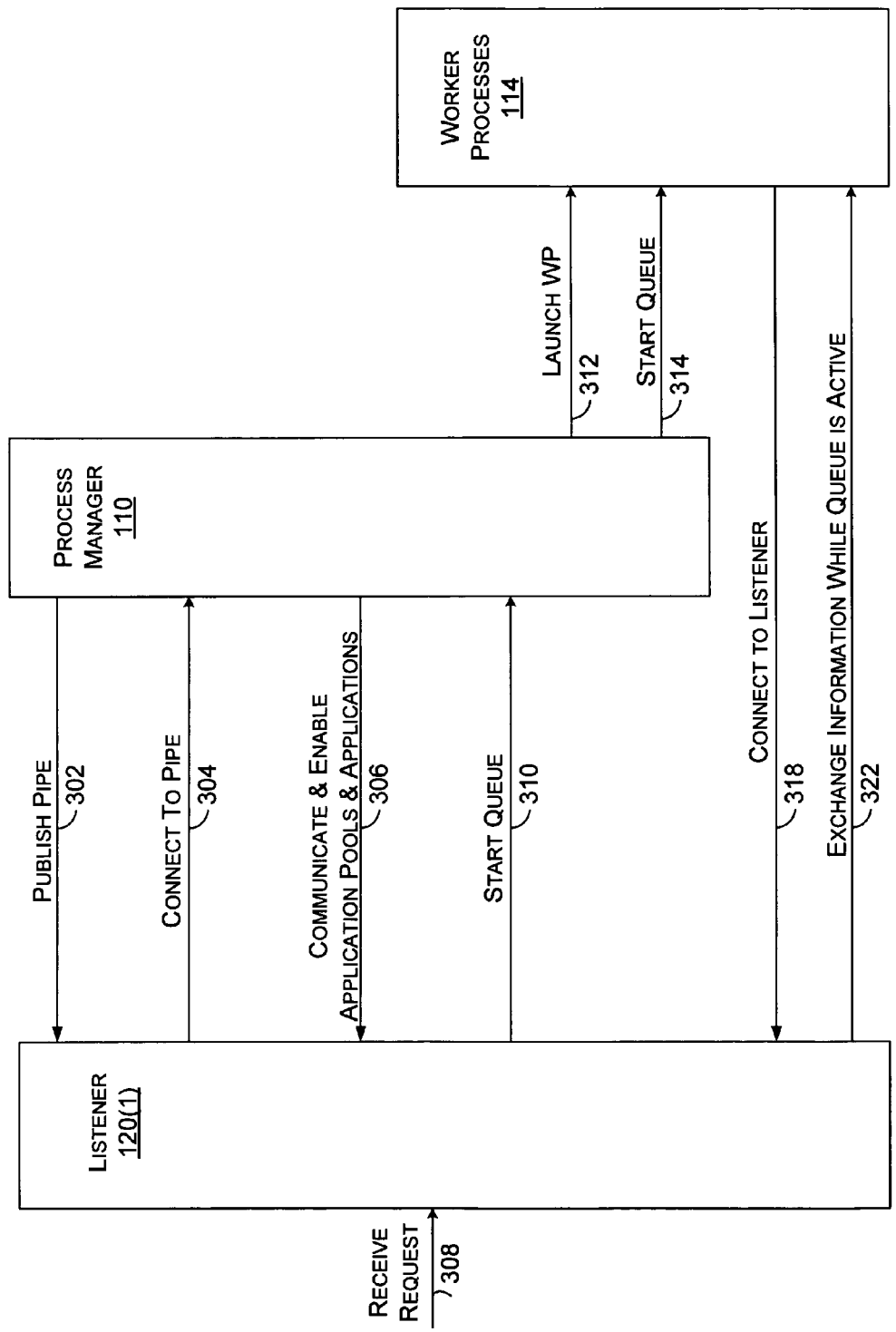
FIG. 3 is a diagram generally illustrating sequence of events in establishing and using a connection between a listener and a worker process, according to one embodiment.

FIG. 3 illustrates a sequence of operations that occur in establishing and using a connection between listener 120(1) and one of worker processes 114 to handle a request received in one of the supported multiple protocols, according to one embodiment. This sequence can also apply to listeners 120(2)-120(M). Referring to FIGS. 2 and 3, a connection is established between listener 120(1) and one of worker processes 114 according to one embodiment as follows.

At an initialization phase of server 102 (FIG. 1), process manager 110 publishes a pipe so that all listeners (that have not yet connected to such a pipe) can attempt to connect to the pipe. In this example, listener 120(1) is the first to detect the published pipe. This operation is represented by an arrow 302 in FIG. 3. As previously described, each listener supports a particular protocol, so that together listeners 120(1)-120(M) support client-server communication in multiple protocols.

In response, listener 120(1) connects to the pipe. This pipe connection is indicated by an arrow 220 in FIG. 2. Other listeners that have not yet connected to a pipe that was published by process manager 110 then have to wait for process manager 110 to publish the next pipe and attempt to connect. This operation is represented by an arrow 304 in FIG. 3.

Once listener 120(1) is connected to the pipe, process manager 110 provides endpoint information 202 to listener 120(1). This operation is represented by an arrow 306 in FIG. 3. As previously described, this information identifies the application(s) that listener 120(1) is to listen for when receiving requests. This information also creates and enables associations between applications and application pools that allow listener 120(1) to identify an appropriate application pool for an application requested in a received request.

Listener 120(1) then "listens" for requests for which it can identify an application and an association of the application with an application pool. If the requested application is associated with an application pool for which listener 120(1) has already created a queue, then the request can be placed in that queue. On the other hand, if the request's application is associated with an application pool for which listener 120(1) has not yet created a queue, then the request can be categorized as one that "needs a new queue".

When listener 120(1) receives a request that needs a new queue (indicated by an arrow 308 in FIG. 3), listener 120(1) then starts a new internal queue such as queue 204(1), for example. In this embodiment, listener adapter 122(1) also signals process manager 110 to start a new queue in a worker process, as indicated by arrow 222 in FIG. 2. As previously described for one embodiment, the protocol of the request is "automatically" indicated by the listener in that each listener supports a particular protocol and has registered this protocol with process manager 110. Thus, process manager 110 knows the protocol of the request by the identity of the listener that starts the queue. This operation is represented by an arrow 310 in FIG. 3.

Process manager 110, in response to listener 120(1) starting a queue, launches a worker process (i.e., one of worker processes 114) corresponding to the application pool associated with the requested application. The worker process can include one or more applications. This operation is represented by an arrow 312 in FIG. 3.

After launching the worker process, process manager 110 in this embodiment also causes the worker process to start a queue for received requests and, in some scenarios, messages to be sent to listener 120(1) in handling the request. This operation is represented by an arrow 314 in FIG. 3. In some scenarios, a worker process may have more than one queue.

In this embodiment, the worker process launched in operation 314 also includes a protocol handler for each protocol needed to support the queue(s) started in that worker process. In one embodiment, starting the queue in the worker process causes the worker process to load a protocol handler corresponding to the protocol supported by listener 120(1).

With the protocol handler loaded, a connection between the worker process and listener 120(1) is established as indicated by an arrow or connection 224 in FIG. 2. As described below, requests in the protocol accepted by listener 120(1) can be routed to and handled by the worker process via connection 224. This operation of forming connection 224 is represented by an arrow 318 in FIG. 3.

In some embodiments, process manager 110 can configure listener 120(1) to request a start of a new queue in the worker process when process manager 110 determines a new instance of a queue is needed or desirable (e.g., as part of a recycling operation to improve stability).

Listener 120(1) and the worker process can then exchange information. For example, listener 120(1) routes requests to the worker process via connection 224 (FIG. 2). In addition, information may also flow over connection 224 from the worker process to the client via listener 120(1). This operation is represented by an arrow 322 in FIG. 3. With listeners 120(2)-120(M) (see FIG. 1) configured to receive requests in other protocols, system 100 (FIG. 1) can advantageously service requests in multiple protocols.

Although a particular sequence of operations is describe above, in other embodiments the operations may be performed in other sequences, with some operations being performed multiple times, in different orders, and/or concurrently with other operations.

Exemplary Operational Flow of a Listener

Figure 4:
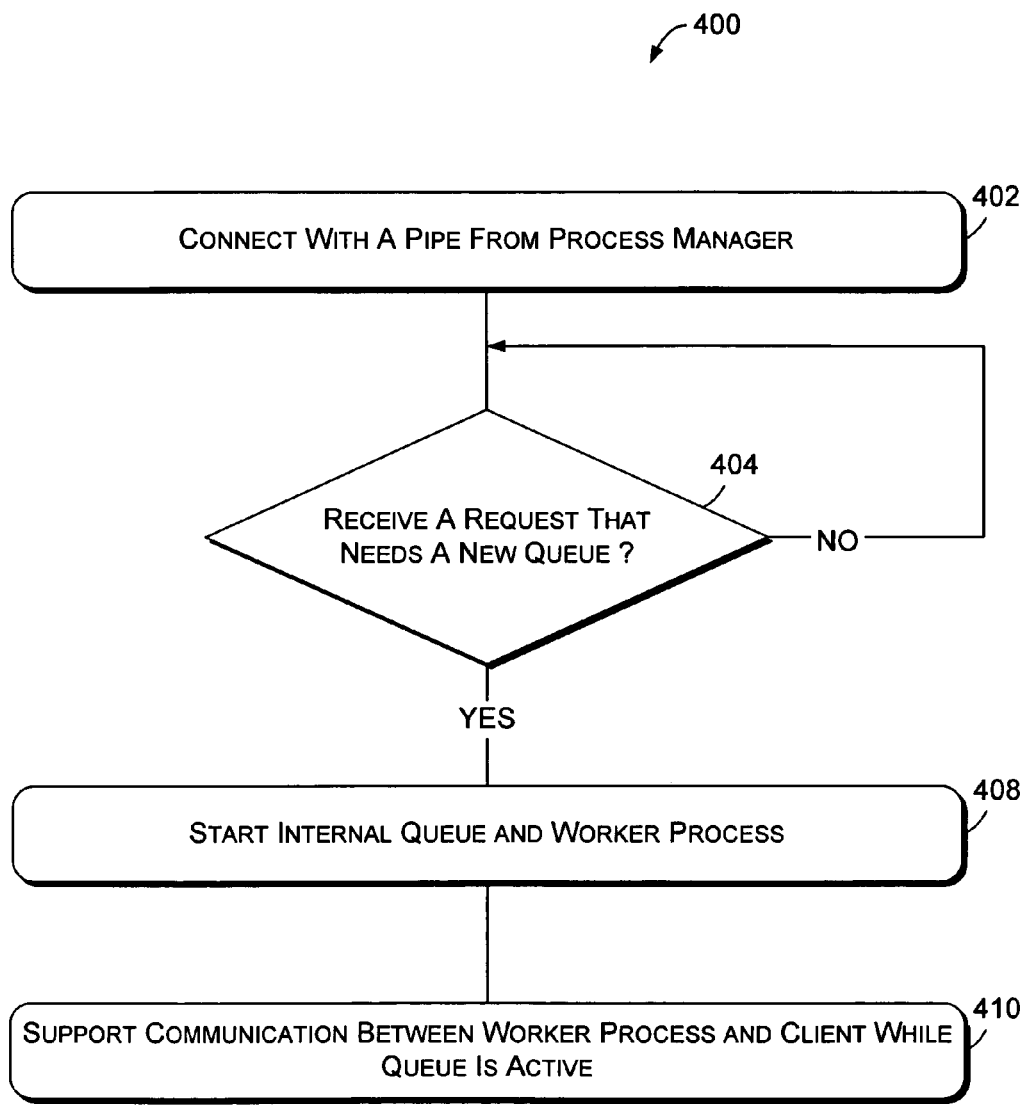
FIG. 4 is a flow diagram generally illustrating operational flow of a particular listener in establishing a connection with a worker process, according to one embodiment.

FIG. 4 is a flow diagram generally illustrating a process 400 by which a listener can establish a connection with a worker process, according to one embodiment. For example, in one embodiment, process 400 can be performed by listener 120(1) as depicted in FIG. 2; however, different listener implementations can be used to perform the process in other embodiments. As previously mentioned, each listener will have already registered with the process manager, declaring the protocol it supports.

At a block 402, a listener connects to a pipe published by a process manager. In one embodiment, for example, the listener is implemented as in listener 120(1) (FIG. 2) and, thus, the listener can connect to the published pipe as described above for operation 304 (FIG. 3). This connection can be used by the process manager to configure the listener. One embodiment of block 402 is described in more detail below in conjunction with FIG. 5.

At a block 404, after being configured, the listener waits to receive a request that requires a new queue. Continuing the above example in which the listener is implemented like listener 120(1), the listener can determine whether a received request needs a queue by determining whether it already has a queue for the application pool associated with the application requested by the request. If such a queue already exists, the listener routes the request to that queue, and the operational flow returns to the beginning of block 404 to await another request. On the other hand, if the listener receives a request for an application that is associated with an application pool for which the listener does not have a queue, the operational flow proceeds to a block 408.

At block 408, the listener creates a queue in the listener (also referred to herein as an internal queue). Continuing the above example, the listener can create the internal queue as described above for operation 310 (FIG. 3). In addition, the listener signals the process manager to start the worker process appropriate for the application pool associated with the request's application. One embodiment of block 408 is described in more detail in conjunction with FIG. 6.

At a block 410, the listener supports transfer of information between the worker process and the client. Continuing the above example, the listener can support this communication as described above for operation 322 (FIG. 3). In this way, the process manager need not be involved in the normal handling of the request. However, in some embodiments, the process manager may monitor this communication and start recovery operations if an error in the request handling should occur.

Although process 400 is illustrated and described sequentially, in other embodiments, the operations described in the blocks may be performed in different orders, multiple times, and/or in parallel.

Figure 5:
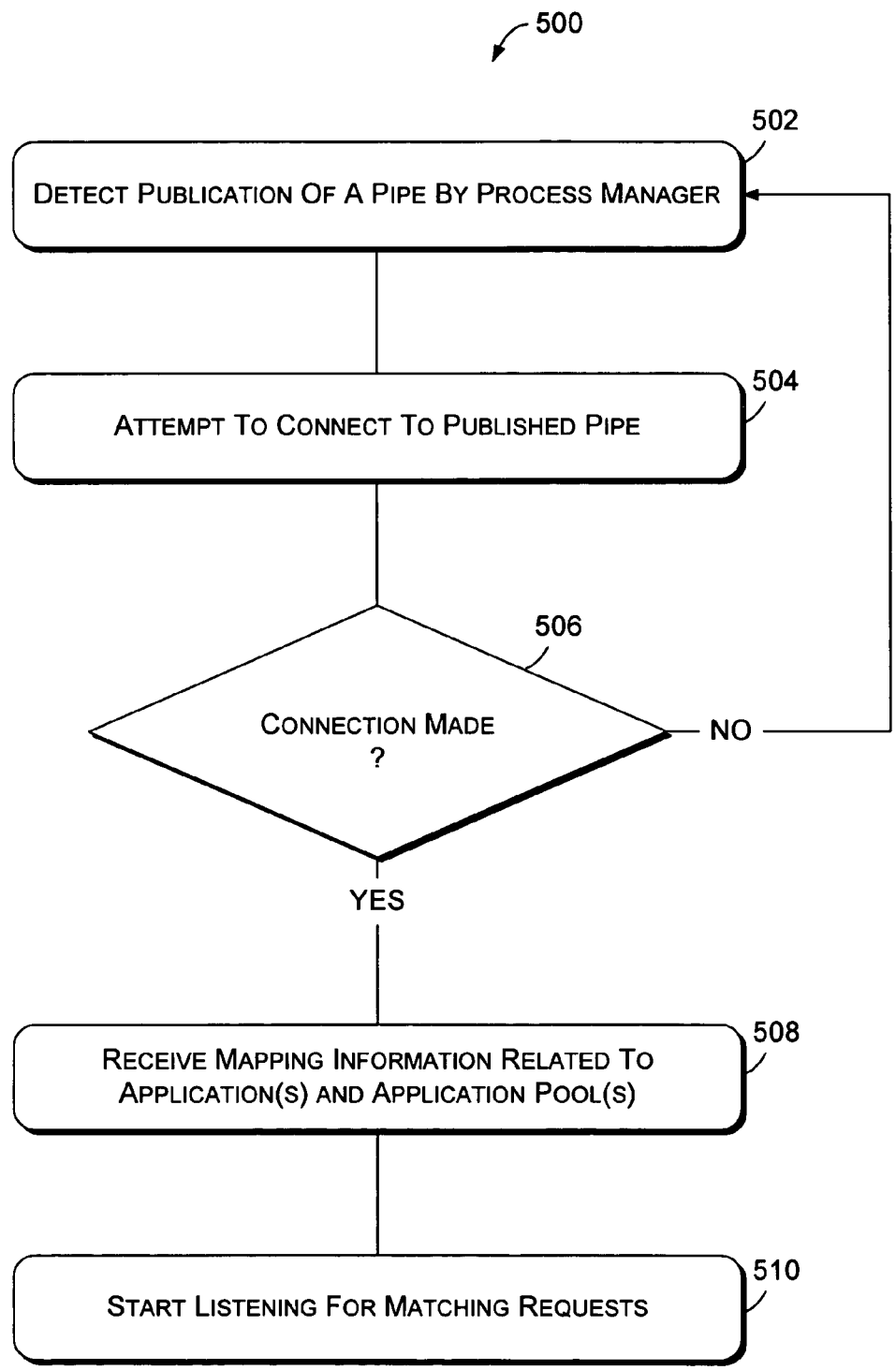
FIG. 5 is a flow diagram generally illustrating a process by which a listener can connect to a process manager, according to one embodiment.

FIG. 5 is a flow diagram generally illustrating a process 500 by which a listener can connect to a process manager, according to one embodiment. This process can be used to implement block 402 of process 400 (FIG. 4). For example, in one embodiment, the process to connect to a process manager can be performed by listener 120(1) as depicted in FIG. 2; however, different listener implementations can be used to perform the process in other embodiments.

At a block 502, the listener detects publication of a pipe by the process manager. During start-up of the server, the process manager would publish a pipe to connect with one of the multiple listeners. All of the listeners that have not connected with the process manager during the start-up phase would attempt to connect with the pipe.

At a block 504, the listener attempts to connect to the published pipe. In one embodiment, the first listener to attempt to connect will make the connection. In this embodiment, other attempts to connect to this published pipe will be rejected or ignored.

At a block 506, if the listener does not connect to the published pipe at block 504, the operational flow loops back to block 502. This looping continues until the listener does connect to a pipe published by the process manager. However, if the listener does connect to a published pipe, the operational flow of process 500 proceeds to a block 508.

At a block 508, the listener receives information related to applications and application pools. As previously described, this information can include associations or mappings between applications and application pools. In addition, the information can identify the application(s) in received requests for which the listener is to listen.

At a block 510, the listener then begins listening for requests for matching application(s). For example, in one embodiment, TCP/IP service 124 (FIG. 2) routes requests to the listeners so that the protocol of the request is the same as the protocol of the listener. When a listener receives a request in this embodiment, the listener determines from the information received in block 508 whether the requested application has been mapped to an application pool. If not, the listener can ignore the request, send an error message, etc. If the request's application has been mapped to an application pool, the process can proceed to block 404 (FIG. 4).

Although process 500 is illustrated and described sequentially, in other embodiments, the operations described in the blocks may be performed in different orders, multiple times, and/or in parallel.

Figure 6:
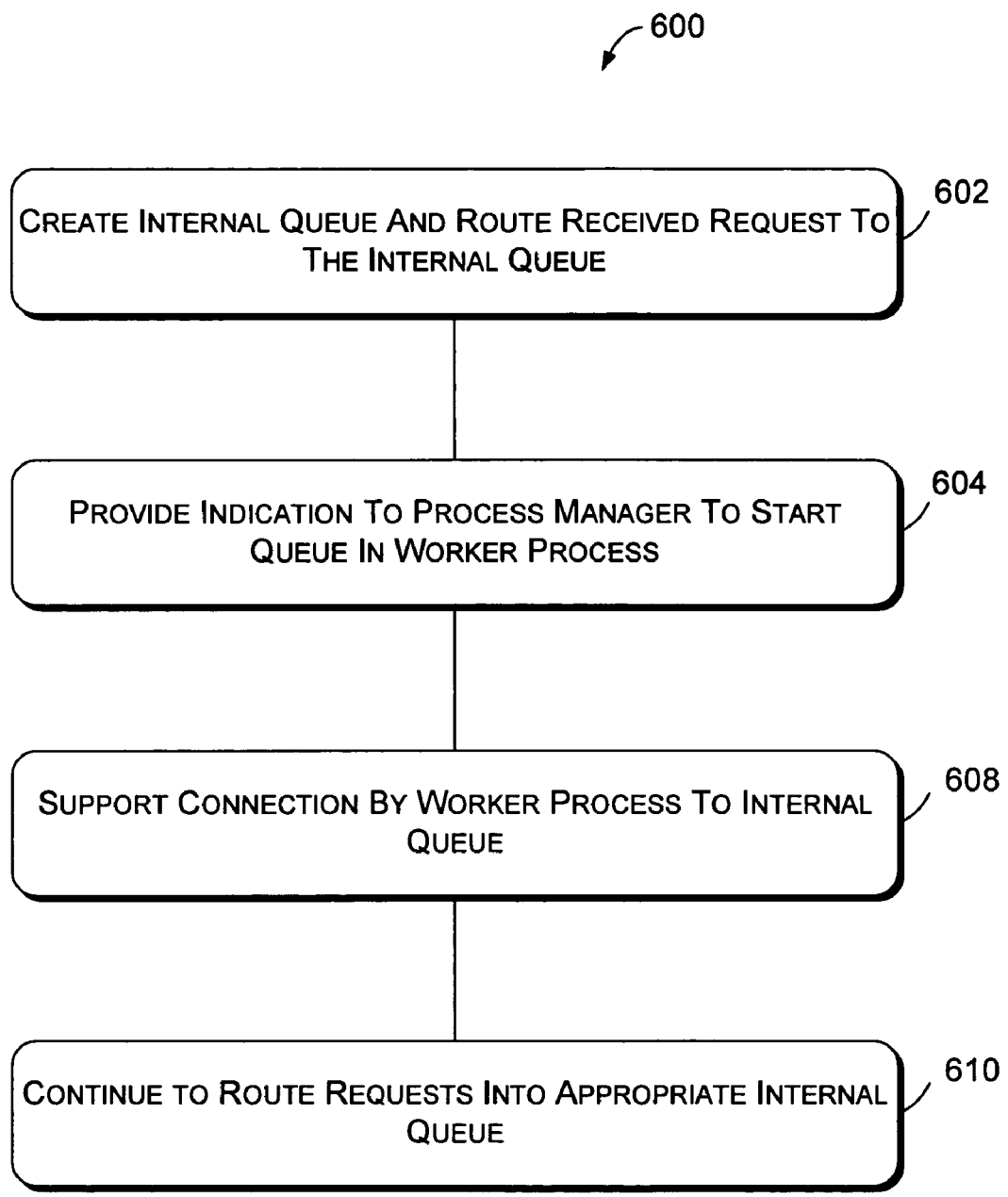
FIG. 6 is a flow diagram generally illustrating a process by which a listener starts a queue and worker process, according to one embodiment.

FIG. 6 is a flow diagram generally illustrating a process 600 by which a listener can selectively start a queue and a worker process in response to a request, according to one embodiment. This process can be used to implement block 408 of process 400 (FIG. 4). For example, in one embodiment, the process of forming a connection with a worker process can be supported by listener 120(1), as depicted in FIG. 2. However, different listener implementations can be used to perform the process in other embodiments.

At a block 602, the listener creates an internal queue corresponding to an application pool associated with an application requested in the received request. For example, in one embodiment the listener can be implemented using listener 120(1) (FIG. 2), which includes queues 204(1)-204(L) that are created by performing block 602. As previously described, these queues can be used by the listener to store received requests.

At a block 604, the listener provides an indication to the process manager to start the queue. In one embodiment, the listener sends a start queue message that causes the process manager to launch an appropriate worker process, which includes starting a queue in the worker process. In other embodiments, the listener may use different techniques to signal the process manager to start the queue.

At a block 608, the listener participates in forming a connection with the worker process. In some embodiments, when the listener performs block 604, the listener may provide an identifier for the queue to the process manager. The process manager can then pass the queue identifier to the worker process, allowing the worker process to connect to the correct queue of the listener (i.e., the internal queue created in performing block 602). In this way, the worker process and listener can transfer information to each other (e.g., the worker process can pull requests from the internal queue).

At a block 610, the listener routes received requests to the appropriate internal queue for handling by the worker process connected to the queue.

Although process 600 is illustrated and described sequentially, in other embodiments, the operations described in the blocks may be performed in different orders, multiple times, and/or in parallel.

Illustrative Operating Environment

The various embodiments described above may be implemented in computer environments of server 102 and clients 104(1)-104(N) of system 100 (FIG. 1). An example computer environment suitable for use in the server and/or clients is described below in conjunction with FIG. 7.

Figure 7:
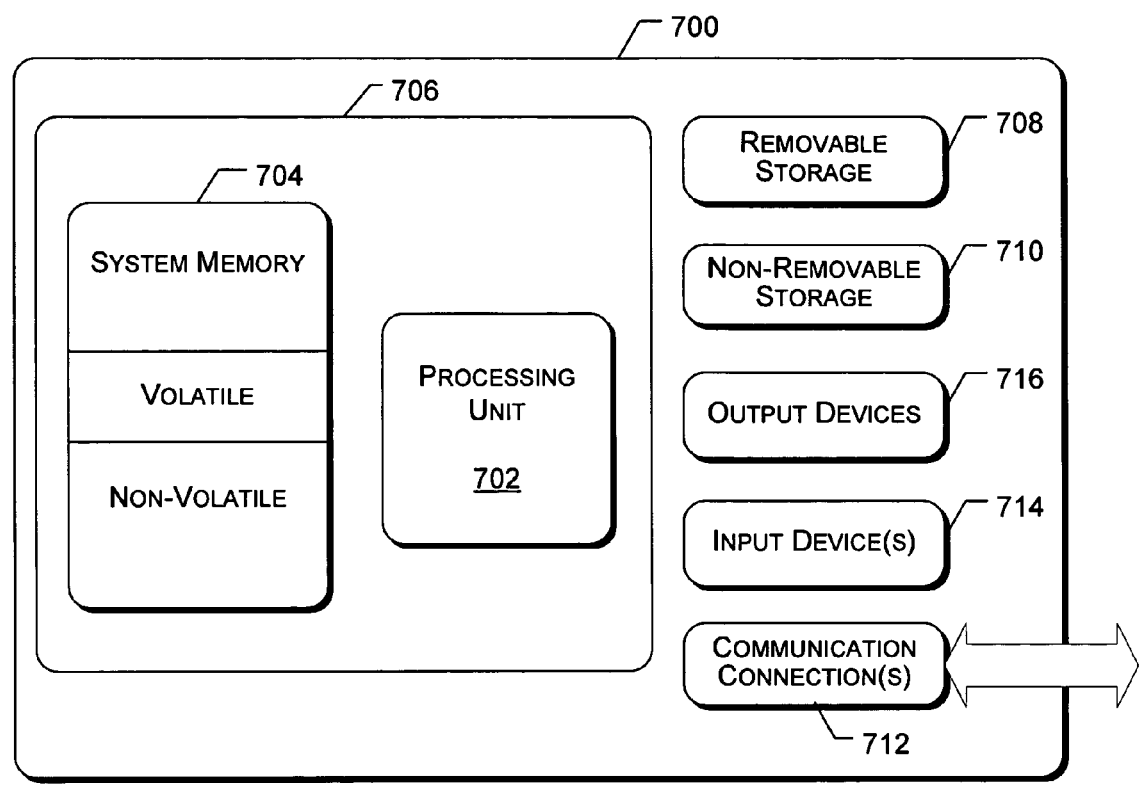
FIG. 7 is a functional block diagram generally showing an illustrative computing environment in which various embodiments of the techniques and mechanisms described herein may be implemented.

FIG. 7 illustrates an exemplary system for implementing embodiments of the invention. The environment includes a computing device, such as computing device 700. In a basic configuration, computing device 700 typically includes at least one processing unit 702 and memory 704. Depending on the exact configuration and type of computing device, memory 704 may be volatile (such as RAM), non-volatile (such as ROM, flash memory, etc.) or some combination of the two. This most basic configuration is illustrated in FIG. 7 by dashed line 706. Additionally, computing device 700 may also have additional features/functionality. For example, computing device 700 may also include additional storage (removable and/or non-removable) including, but not limited to, magnetic or optical disks or tape. Such additional storage is illustrated in FIG. 7 by removable storage 708 and non-removable storage 710. Computer storage media includes volatile and nonvolatile, removable and non-removable media implemented in any method or technology for storage of information such as computer readable instructions, data structures, program modules or other data. Memory 704, removable storage 708 and non-removable storage 710 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by computing device 700. Any such computer storage media may be part of computing device 700.

Computing device 700 may also contain communications connection(s) 712 that allow the device to communicate with other devices. Communications connection(s) 712 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Computing device 700 may also have input device(s) 714 such as keyboard, mouse, pen, voice input device, touch input device, etc. Output device(s) 716 such as a display, speakers, printer, etc. may also be included. All these devices are well know in the art and need not be discussed at length here.

Computing device 700 may include a variety of computer readable media. Computer readable media can be any available media that can be accessed by computing device 700 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computing device 700. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

Various modules and techniques may be described herein in the general context of computer-executable instructions, such as program modules, executed by one or more computers or other devices. Generally, program modules include routines, programs, objects, components, data structures, etc. for performing particular tasks or implement particular abstract data types. These program modules and the like may be executed as native code or may be downloaded and executed, such as in a virtual machine or other just-in-time compilation execution environment. Typically, the functionality of the program modules may be combined or distributed as desired in various embodiments.

An implementation of these modules and techniques may be stored on or transmitted across some form of computer readable media. Computer readable media can be any available media that can be accessed by a computer. By way of example, and not limitation, computer readable media may comprise "computer storage media" and "communications media."

"Computer storage media" includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media. The term "modulated data signal" means a signal that has one or more of its characteristics set or changed in such a manner as to encode information in the signal. As a non-limiting example only, communication media includes wired media such as a wired network or direct-wired connection, and wireless media such as acoustic, RF, infrared, and other wireless media. Combinations of any of the above are also included within the scope of computer readable media.

Reference has been made throughout this specification to "one embodiment," "an embodiment," or "an example embodiment" meaning that a particular described feature, structure, or characteristic is included in at least one embodiment of the present invention. Thus, usage of such phrases may refer to more than just one embodiment. Furthermore, the described features, structures, or characteristics may be combined in any suitable manner in one or more embodiments.

One skilled in the relevant art may recognize, however, that the invention may be practiced without one or more of the specific details, or with other methods, resources, materials, etc. In other instances, well known structures, resources, or operations have not been shown or described in detail merely to avoid obscuring aspects of the invention.

While example embodiments and applications have been illustrated and described, it is to be understood that the invention is not limited to the precise configuration and resources described above. Various modifications, changes, and variations apparent to those skilled in the art may be made in the arrangement, operation, and details of the methods and systems of the present invention disclosed herein without departing from the scope of the claimed invention.

What is claimed is:

1. A method to form a connection between a first listener and a second listener and a plurality of worker processes in a server, the server including a process manager, the first listener to support requests in a first protocol and the second listener to support requests in a second protocol, the method comprising:
   receiving a request from a client, the request conforming to the first protocol;
   routing, based at least on protocol support capability, the request to the first listener that supports the first protocol;
   providing, to the process manager, an indication that causes the process manager to launch one of the plurality of worker processes to handle requests in the first protocol, the one of the plurality of worker processes being configurable to handle requests in a plurality of protocols and the indication comprising the first listener's identity;
   forming a connection between the first listener and the process manager in response to the process manager publishing a pipe that is to be used by the process manager in receiving information from the first listener;
   causing the process manager to invoke in the one of the plurality of worker processes a protocol handler to support the first protocol; and
   supporting, by the first listener, a connection between the one of the plurality of worker processes and the first listener, wherein the request is provided to the one of the plurality of worker processes via the connection.

2. The method of claim 1, further comprising receiving information used to cause the first listener to listen for requests of a specified application.

3. The method of claim 1, further comprising receiving information that associates an application to an application pool.

4. The method of claim 3, wherein the received information includes information that selectively disables the application or the application pool.

5. The method of claim 1, further comprising creating at least one queue in the first listener, the at least one queue being created by the first listener.

6. An apparatus for forming a connection between a first listener and a second listener and a plurality of worker processes in a server, the server including a process manager, a first listener to support requests in a first protocol and a second listener to support requests in a second protocol, the apparatus comprising:
   computer storage medium having stored thereon:
      means for receiving a request from a client, the request conforming to the first protocol;
      means for routing, based at least on protocol support capability, the request to the first listener that supports the first protocol;
      means for providing, to the process manager, an indication that causes the process manager to launch one of the plurality of worker processes to handle requests in the first protocol, the one of the plurality of worker processes to selectively handle requests in one or more of a plurality of protocols and the indication comprising the first listener's identity;
      means for forming a connection between the first listener and the process manager in response to the process manager publishing a pipe that is to be used by the process manager in receiving information from the first listener;

means for causing the process manager to invoke in one of the plurality of worker processes a protocol handler to support the first protocol; and means for supporting, by the first listener, a connection between the one of the plurality of worker processes and the first listener, wherein the request is to be provided to the one of the plurality of worker processes via the connection.

7. The apparatus of claim 6, further comprising means for receiving information used in configuring the first listener to listen for requests of a preselected application.

8. The apparatus of claim 6, further comprising means for receiving information that associates an application to an application pool.

9. The apparatus of claim 8, wherein the received information includes information that selectively disables the application or the application pool.

10. A system, comprising:
a plurality of clients;
a network coupled to the plurality of clients; and
a server, coupled to the network, including a process manager, a configuration store, and a plurality of listeners to receive requests in a plurality of protocols, wherein each listener is to:
receive a request from a client, the request conforming to a protocol of the plurality of protocols;
provide, to the process manager, an indication that causes the process manager to launch one of a plurality of worker processes to handle requests in the protocol, the one of the plurality of worker processes being configurable to handle requests in the plurality of protocols and the indication comprising the listener's identity;
form a connection with the process manager in response to the process manager publishing a pipe that is to be used by the process manager in receiving information from the first listener;
cause the process manager to invoke in the one of the plurality of worker processes a protocol handler to support the protocol; and
support forming a connection to the one of the plurality of worker processes, wherein the request is provided to the one of the plurality of worker processes via the connection.

11. The system of claim 10, wherein each listener is to receive information used to cause that listener to listen for requests that request a preselected application.

12. The system of claim 10, wherein each listener is to receive information that associates an application to an application pool.

13. The system of claim 12, wherein the received information includes information that selectively disables the application or the application pool.

14. The system of claim 10, wherein each listener further comprises a queue created in response to the received request, the queue created by a respective listener to store requests to be routed to the worker process.

15. The system of claim 14, wherein each listener can selectively include a plurality queues to route requests to a plurality of worker processes, the plurality of queues being created by a respective listener.

* * * * *